United States Patent
Li et al.

(10) Patent No.: US 12,437,834 B2
(45) Date of Patent: Oct. 7, 2025

(54) OPERATION METHOD OF MEMORY, MEMORY AND MEMORY SYSTEM

(71) Applicant: Yangtze Memory Technologies Co., Ltd., Hubei (CN)

(72) Inventors: Zhefan Li, Wuhan (CN); Xiaodong Mei, Wuhan (CN); Huangpeng Zhang, Wuhan (CN); Yu Wang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 49 days.

(21) Appl. No.: 18/495,696

(22) Filed: Oct. 26, 2023

(65) Prior Publication Data

US 2025/0054565 A1 Feb. 13, 2025

(30) Foreign Application Priority Data

Aug. 9, 2023 (CN) .......................... 202311000894.X

(51) Int. Cl.
*G11C 29/00* (2006.01)
(52) U.S. Cl.
CPC .................................. *G11C 29/883* (2013.01)
(58) Field of Classification Search
CPC .................................................... G11C 28/883
See application file for complete search history.

(56) References Cited

U.S. PATENT DOCUMENTS

| | | | |
|---|---|---|---|
| 6,590,816 B2 | 7/2003 | Perner | |
| 7,565,585 B2 | 7/2009 | Ellis et al. | |
| 9,063,902 B2 | 6/2015 | Cordero et al. | |
| 9,349,491 B1* | 5/2016 | Morgan | G11C 29/88 |
| 9,583,219 B2 | 2/2017 | Kim et al. | |
| 9,767,922 B2 | 9/2017 | Lee et al. | |
| 2017/0133108 A1* | 5/2017 | Lee | G11C 29/78 |
| 2017/0185499 A1* | 6/2017 | Lee | G11C 7/12 |
| 2018/0102185 A1* | 4/2018 | Yang | G11C 29/78 |
| 2019/0096508 A1* | 3/2019 | Kim | G11C 8/08 |
| 2019/0333601 A1* | 10/2019 | Wilson | G11C 17/16 |
| 2020/0117558 A1* | 4/2020 | Wilson | G06F 12/0246 |

OTHER PUBLICATIONS

Power-On Reset and Related Supervisory Functions, Maxim Integrated Application Note 3227, Jul. 8, 2004. Retrieved from the Internet. <URL: https://www.analog.com/en/resources/technical-articles/poweron-reset-and-related-supervisory-functions.html> (Year: 2004).*

* cited by examiner

*Primary Examiner* — Matthew M Kim
*Assistant Examiner* — Bryan P Huang
(74) *Attorney, Agent, or Firm* — Fish & Richardson P.C.

(57) ABSTRACT

Examples of the present application provide operation methods of memories, memory devices and systems. In an example, an operation method includes: in response to a first defective memory cell row of a plurality of memory cell rows in the memory being repaired before packaging, invalidating, in a post-package repair mode, a first repair strategy for repairing the first defective memory cell row before packaging, and configuring a second repair strategy for repairing the first defective memory cell row and storing the second repair strategy.

20 Claims, 17 Drawing Sheets

OPERATION METHOD OF MEMORY, MEMORY AND MEMORY SYSTEM

CROSS-REFERENCE TO RELATED APPLICATIONS

This application claims priority to Chinese Patent Application No. 202311000894.X, filed on Aug. 9, 2023, which is hereby incorporated by reference in its entirety.

TECHNICAL FIELD

The present application relates to the field of memory technologies, and in particular, to an operation method of a memory, a memory, and a memory system.

BACKGROUND

In a memory, information can be stored in memory cells which can be organized into rows (word lines) and columns (bit lines). At various points during the manufacture and use of the memory, one or more memory cells may fail (e.g., become unable to store information, be inaccessible by the memory, etc.) and may need to be repaired.

SUMMARY

Some examples of the concept of the present application provide an operation method of a memory, a memory, and a memory system.

On the one hand, an example of the present application provides an operation method of a memory, the memory comprising a plurality of memory cell rows, wherein the method comprises:

in a post-package repair (PPR) mode, in response to a first defective memory cell row of the plurality of memory cell rows has been repaired before packaging, invalidating a first repair strategy for repairing the first defective memory cell row before packaging; and configuring a second repair strategy for repairing the first defective memory cell row and storing the second repair strategy.

In the above solution, the memory further comprises a read-only memory (ROM), and the invalidating a first repair strategy for repairing the first defective memory cell row before packaging comprises:

acquiring first record information stored in the ROM, wherein the first record
information comprises the first repair strategy; and
setting a first control bit in the first record information to a first preset value;
wherein when the first control bit is the first preset value, the first repair strategy is in an invalid state.

In the above solution, the memory further comprises a content addressable memory (CAM) coupled to the plurality of memory cell rows, and the method further comprises:

acquiring first address information of the first defective memory cell row;
comparing the first address information with address information stored in the CAM; and
in response to a comparison result indicates that a same address information as the first address information is stored in the CAM, generating indication information, wherein the indication information is to indicate that the first defective memory cell row has been repaired.

In the above solution, the acquiring first record information stored in the ROM comprises:

in response to indication information, obtaining second address information stored in the first record information according to first address information of the first defective memory cell row and a first mapping relationship, wherein the first mapping relationship comprises a correspondence between address information of a defective memory cell row and address information stored in corresponding record information; and
acquiring the first record information from the ROM according to the second address information;
wherein the indication information is to indicate that the first defective memory cell row has been repaired.

In the above solution, the memory further comprises a plurality of first redundant cell rows, and the configuring a second repair strategy for repairing the first defective memory cell row and storing the second repair strategy comprise:

selecting a first redundant cell row from the plurality of first redundant cell rows to establish a second mapping relationship with the first defective memory cell row, wherein the second mapping relationship is the second repair strategy; and
generating second record information according to the second repair strategy;
storing the second recording information into the ROM;
wherein the first control bit in the second record information is a second preset value, and when the first control bit is the second preset value, the second repair strategy is in a valid state.

In the above solution, the method further comprising:
when performing an operation on the memory, determining whether the first repair strategy is valid or the second repair strategy is valid;
in response to the first repair strategy being valid: loading the first repair strategy; and repairing the first defective memory cell row using the first repair strategy; and
in response to the second repair strategy being valid: loading the second repair strategy; and repairing the first defective memory cell row using the second repair strategy.

In the above solution, the determining whether the first repair strategy is valid or the second repair strategy is valid comprises:

acquiring the first record information and the second record information; and
determining whether the first repair strategy is valid or the second repair strategy is valid according to the first control bit in the first record information and the first control bit in the second record information;
wherein a value to which the first control bit corresponding to the first repair strategy is set is always different from a value to which the first control bit corresponding to the second repair strategy is set.

In the above solution, the memory further comprises a plurality of second redundant cell rows different from the plurality of first redundant cell rows, and the first repair strategy comprises a mapping relationship between the first defective memory cell row and a second redundant cell row of the plurality of second redundant cell rows.

In the above solution, the first record information further comprises a second control bit, wherein the second control bit is to indicate whether the first repair strategy is to be enabled.

In the above solution, the operation comprises performing a power-on-reset operation on the memory.

On the other hand, the example of the present application also provides a memory, comprising:

a memory array comprising a plurality of memory cell rows;

a peripheral circuit coupled to the memory array and configured to:

in a post-package repair (PPR) mode, in response to a first defective memory cell row of the plurality of memory cell rows has been repaired before packaging, invalidate a first repair strategy for repairing the first defective memory cell row before packaging; and configure a second repair strategy for repairing the first defective memory cell row and store the second repair strategy.

In the above solution, the memory further comprises a read-only memory (ROM), and the peripheral circuit is further configured to:

acquire first record information stored in the ROM, wherein the first record information comprises the first repair strategy; and set a first control bit in the first record information to a first preset value;

wherein when the first control bit is the first preset value, the first repair strategy is in an invalid state.

In the above solution, the memory further comprises a content-addressable memory (CAM) coupled to the plurality of memory cell rows, and the peripheral circuit is further configured to:

acquire first address information of the first defective memory cell row and transmit the first address information to the CAM; and wherein, the CAM is configured to: compare the first address information with address information stored in the CAM; and in response to a comparison result indicates that a same address information as the first address information is stored in the CAM, generate indication information, wherein the indication information is to indicate that the first defective memory cell row has been repaired.

In the above solution, the peripheral circuit is further configured to:

in response to indication information, obtain second address information stored in the first record information according to first address information of the first defective memory cell row and a first mapping relationship, wherein the first mapping relationship comprises a correspondence between address information of a defective memory cell row and address information stored in corresponding record information; and acquire the first record information from the ROM according to the second address information;

wherein the indication information is to indicate that the first defective memory cell row has been repaired.

In the above solution, the memory array further comprises a plurality of first redundant cell rows, and the peripheral circuit is further configured to:

select a first redundant cell row from the plurality of first redundant cell rows to establish a second mapping relationship with the first defective memory cell row, wherein the second mapping relationship is the second repair strategy;

generate second record information according to the second repair strategy; and store the second recording information into the ROM;

wherein the first control bit in the second record information is a second preset value, and when the first control bit is the second preset value, the second repair strategy is in a valid state.

In the above solution, the peripheral circuit is further configured to: when performing an operation on the memory, determining whether the first repair strategy is valid or the second repair strategy is valid;

in response to the first repair strategy being valid: loading the first repair strategy; and repairing the first defective memory cell row using the first repair strategy; and in response to the second repair strategy being valid: loading the second repair strategy; and repairing the first defective memory cell row using the second repair strategy.

In the above solution, wherein the peripheral circuit is further configured to: acquire the first record information and the second record information; and determine whether the first repair strategy is valid or the second repair strategy is valid according to the first control bit in the first record information and the first control bit in the second record information;

wherein a value to which the first control bit corresponding to the first repair strategy is set is always different from a value to which the first control bit corresponding to the second repair strategy is set.

In the above solution, the memory array further comprises a plurality of second redundant cell rows different from the plurality of first redundant cell rows, and the first repair strategy comprises a mapping relationship between the first defective memory cell row and a second redundant cell row of the plurality of second redundant cell rows.

In yet another aspect, an example of the present application further provides a memory system, comprising: one or more memories according to any one of the preceding aspects; and a memory controller coupled to the memories and configured to control the memories.

In yet another aspect, a computer system comprises: the aforementioned memory system; and an image processor coupled to the memory system and configured to control the memory system.

Examples of the present application provide an operation method of a memory, a memory, and a memory system. The operation method includes: in a post-package repair (PPR) mode, in response to a first defective memory cell row of the plurality of memory cell rows has been repaired before packaging, invalidating a first repair strategy for repairing the first defective memory cell row before packaging; and configuring a second repair strategy for repairing the first defective memory cell row and storing the second repair strategy. According to the operation method provided by the example of the present application, in the PPR mode, the first repair strategy used for the repaired first defective cell row is invalidated; and the second repair strategy is then reconfigured to avoid conflicts in subsequent use caused by repeated repairs of the same defective cell row.

BRIEF DESCRIPTION OF THE DRAWINGS

In the drawings, which are not necessarily to scale, like reference numerals may describe similar components in the different views. The same numbers with a different letter suffix may indicate different instances of similar components. The drawings illustrate various examples discussed in this document, by way of example and not limitation.

DETAILED DESCRIPTION

Figure 1:
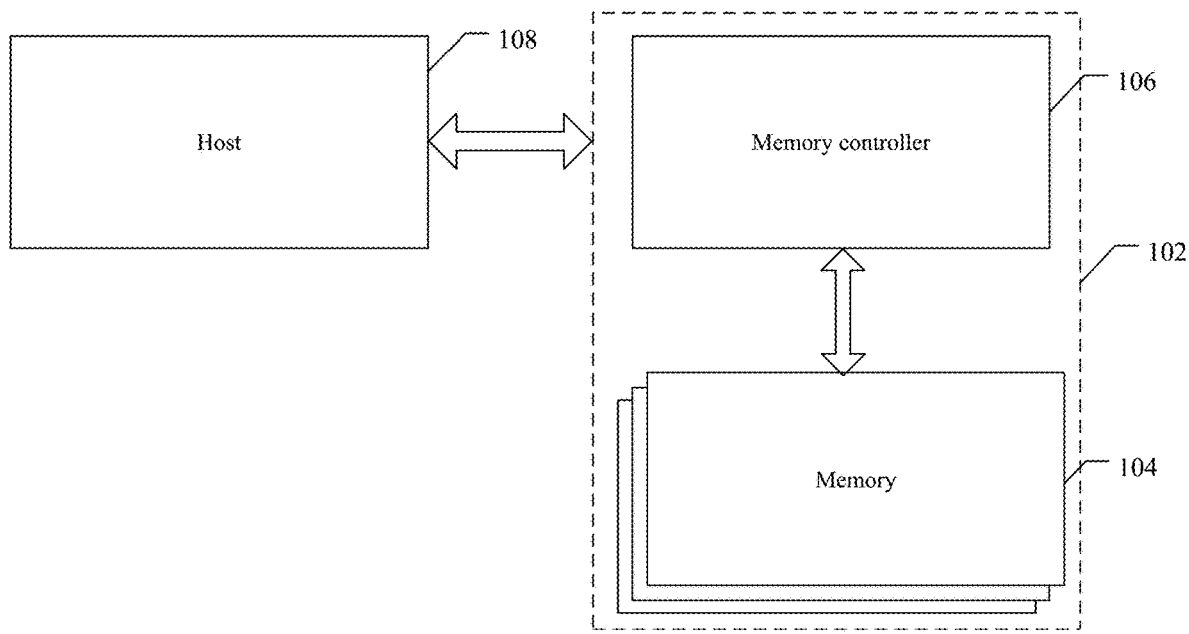
FIG. 1 is a schematic diagram of an example system with a memory system according to some aspects of the present application.

Example implementations disclosed in the present application will be described in more detail below with reference to the accompanying drawings. Although example implementation of the present application are shown in the drawings, it should be understood that the present application may be implemented in various ways and should not be limited to the DETAILED DESCRIPTION set forth herein. Rather, these example implementations are provided so that the present application can be more thoroughly understood and the scope of the present application can be fully conveyed to those skilled in the art.

In the following description, numerous specific details are given in order to provide a more thorough understanding of the present application. It will be apparent, however, to one skilled in the art that the present application may be practiced without one or more of these details. In other examples, some technical features well-known in the art are not described to avoid confusion with the present application; that is, not all features of the actual example are described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on." "adjacent to," "connected to" or "coupled to" other elements or layers, it can be directly on, adjacent to, connected to, or coupled to other elements or layers, or intervening elements or layers may be present. In contrast, when an element is referred to as being "directly on." "directly adjacent to," "directly connected to" or "directly coupled to" other elements or layers, there are no intervening elements or layers. It will be understood that, although the terms such as first, second, third etc. may be used to describe at least one of various elements, components, regions, layers or sections, at least one of these elements, components, regions, layers or sections should not be limited by these terms. These terms are only used to distinguish one element, component, region, layer or section from another element, component, region, layer or section. Thus, a first element, component, region, layer or section discussed below could be represented as a second element, component, region, layer or section without departing from the teachings of the present application. When a second element, component, region, layer or section is discussed, it does not indicate that a first element, component, region, layer or section exists in the present application.

Spatial terms such as "under", "below", "beneath", "underneath", "on", "above" and so on, can be used here for convenience to describe the relationship between one element or feature and other elements or features shown in the figures. It will be understood that the spatially relationship terms also comprise different orientations of the device in use and operation in addition to the orientation depicted in the figures. For example, if the device in the figures is turned over, elements or features described as "below" or "underneath" or "under" other elements or features would then be oriented as "above" the other elements or features. Thus, the example terms "below" and "under" can comprise both orientations of above and below. The device may be otherwise oriented (rotated 90 degrees or at other orientations) and the spatial descriptors used herein may be interpreted accordingly.

The terminology used herein is for the purpose of describing particular examples only and is not to be taken as a limitation of the present application. As used herein, "a", "an" and "said/the" in singular forms are intended to include the plural forms as well, unless the context clearly dictates otherwise. It should also be understood that at least one of the terms "consists of" or "comprising", when used in this specification, identify the presence of at least one of stated features, integers, operations, elements or components, but do not exclude presence or addition of at least one of one or more other features, integers, operations, elements, components or groups. As used herein, the term "at least one of . . . " includes any and all combinations of the associated listed items.

For case of understanding the characteristics and technical content of the examples of the present application in more detail, the example of the examples of the present application will be described in detail below in conjunction with the accompanying drawings. The attached drawings are only for reference and description, and are not intended to limit the examples of the present application.

The examples of the present application will be further described in detail below in conjunction with the accompanying drawings and examples.

FIG. 1 shows a block diagram of an example system with a memory system. In FIG. 1, the system 100 may be a mobile phone, desktop computer, laptop computer, tablet computer, vehicle computer, game console, printer, positioning device, wearable electronic device, smart sensor, virtual reality (VR) device, augmented reality device or any other suitable electronic device having storage therein. As shown in FIG. 1, the system 100 may include a host 108 and a memory system 102 having one or more memories 104 and a memory controller 106. The host 108 may be, for example, a central processing unit (CPU) or an image processor (GPU). The host 108 may be configured to send data to or receive data from the memory 104 by means of the memory controller 106.

The memory controller 106 is coupled to the memory 104 and the host 108 and is configured to control the memory 104. The memory controller 106 may manage data stored in the memory 104 and communicate with the host 108.

The memory controller 106 may be configured to control operations of the memory 104, such as read, erase, write, and refresh operations. In some implementations, the memory controller 106 is further configured to process error correction code (ECC) with regard to data read from or written to the memory 104. Memory controller 106 may further perform any other suitable functions, such as formatting the memory 104. Memory controller 106 may communicate with external devices (e.g., host 108) according to a particular communication protocol.

In some examples, one or more memories 104 and the memory controller 106 can be integrated into various types of memory devices. For example, multiple memories 104 can be integrated into memory sticks, and the memory controller 106 can be integrated into the North bridge of the main board or directly integrated into the CPU. That is, the memory system 102 can be implemented and packaged into different types of terminals or electronic products.

Figure 2:
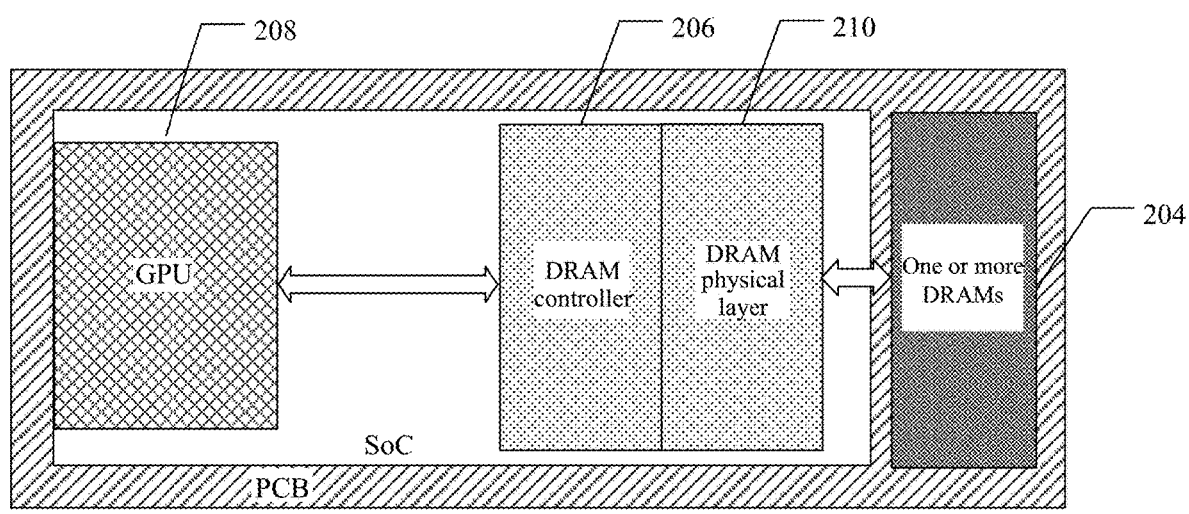
FIG. 2 is a schematic diagram of an example electronic device with a memory system according to some aspects of the present application.

In an example system as shown in FIG. 2, the system includes a System on Chip (SoC) and one or more memories. The memories include DRAM 204, and the SoC includes an image processor (GPU) 208, a DRAM controller 206, and a DRAM physical layer 210. The DRAM controller 206 is in charge of the scheduling of read and write instructions and the timing control of the DRAM 204. The DRAM physical layer 210 is in charge of encoding the scheduled instructions according to the requirements of the DRAM 204, and sending corresponding written data to the DRAM 204, and receive data read from the DRAM 204. PCB means printed circuit board.

Figure 3:
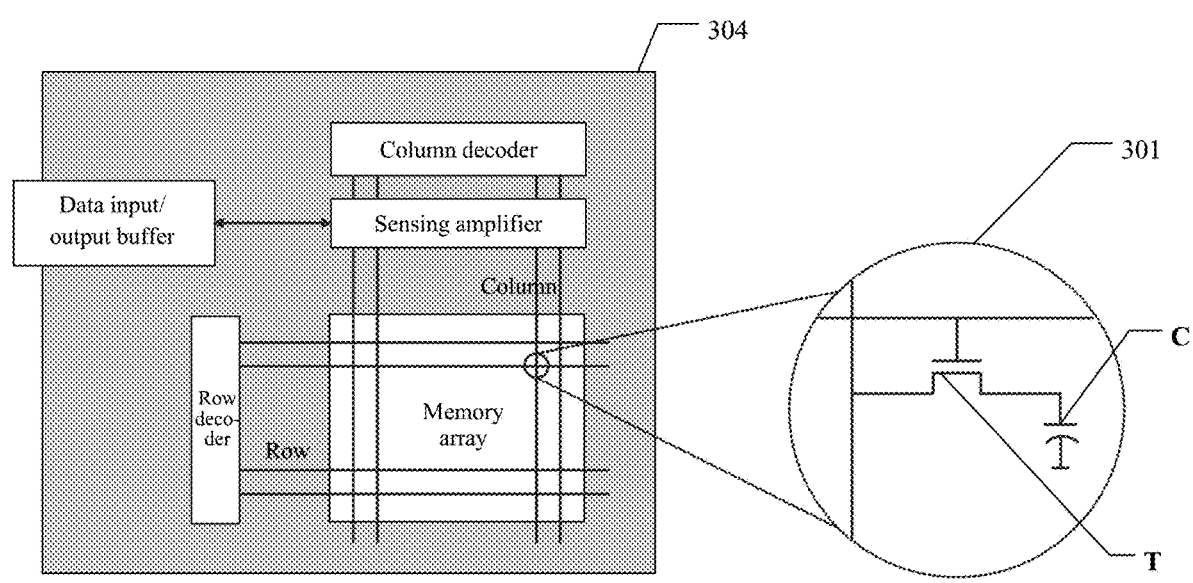
FIG. 3 is a schematic diagram of the composition principle of a memory according to some aspects of the present application.

FIG. 3 is a schematic diagram of an example memory DRAM according to examples of the present application. The right side of FIG. 3 shows the circuit of a memory cell in the DRAM. Each DRAM die 304 includes a memory array that includes a plurality of memory cells 301 arranged in an array. Each memory cell 301 includes a transistor T and a capacitor C. The main operation principle of the memory cell is to use the amount of charge stored in the capacitor to represent whether a binary bit is 1 or 0. The memory cells are arranged in an array, which can be regarded as a typical mesh structure. The memory array uses row and column to specify the address. By specifying an intersection of a row and a column (by specifying a row address and a column address of the DRAM), the memory controller can independently access individual memory cells in the DRAM die, and read or write the data stored therein.

In some examples, the memory may include a memory array and a peripheral circuit. The memory array includes multiple banks, and each bank may be divided into multiple blocks or referred as a storage bank. Each block includes a plurality of memory cell rows and a plurality of memory cell columns, wherein each memory cell row is coupled to a corresponding word line, and each memory cell column is coupled to a corresponding bit line. The peripheral circuit may include a series of Complementary Metal-Oxide-Semiconductor (CMOS) control circuits. For example, this series of CMOS control circuits includes: a control circuit corresponding to each block, for example, a Sensing Amplifier (SA) and a Word-Line Driver (WLD), etc.; a control circuit corresponding to each bank, for example, a row decoder, a column decoder, etc.; and a control circuit corresponding to all banks, for example, a command buffer, a command decoder, an address buffer, a data buffer, a mode register, etc.

Figure 4:
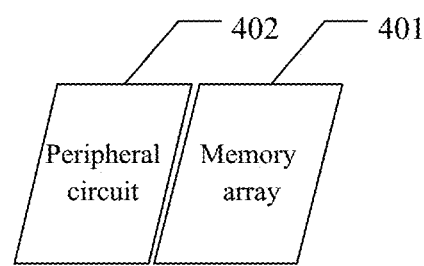
FIG. 4 is a first schematic diagram of the distribution of a memory array and a peripheral circuit according to some aspects of the present application.
Figure 5:
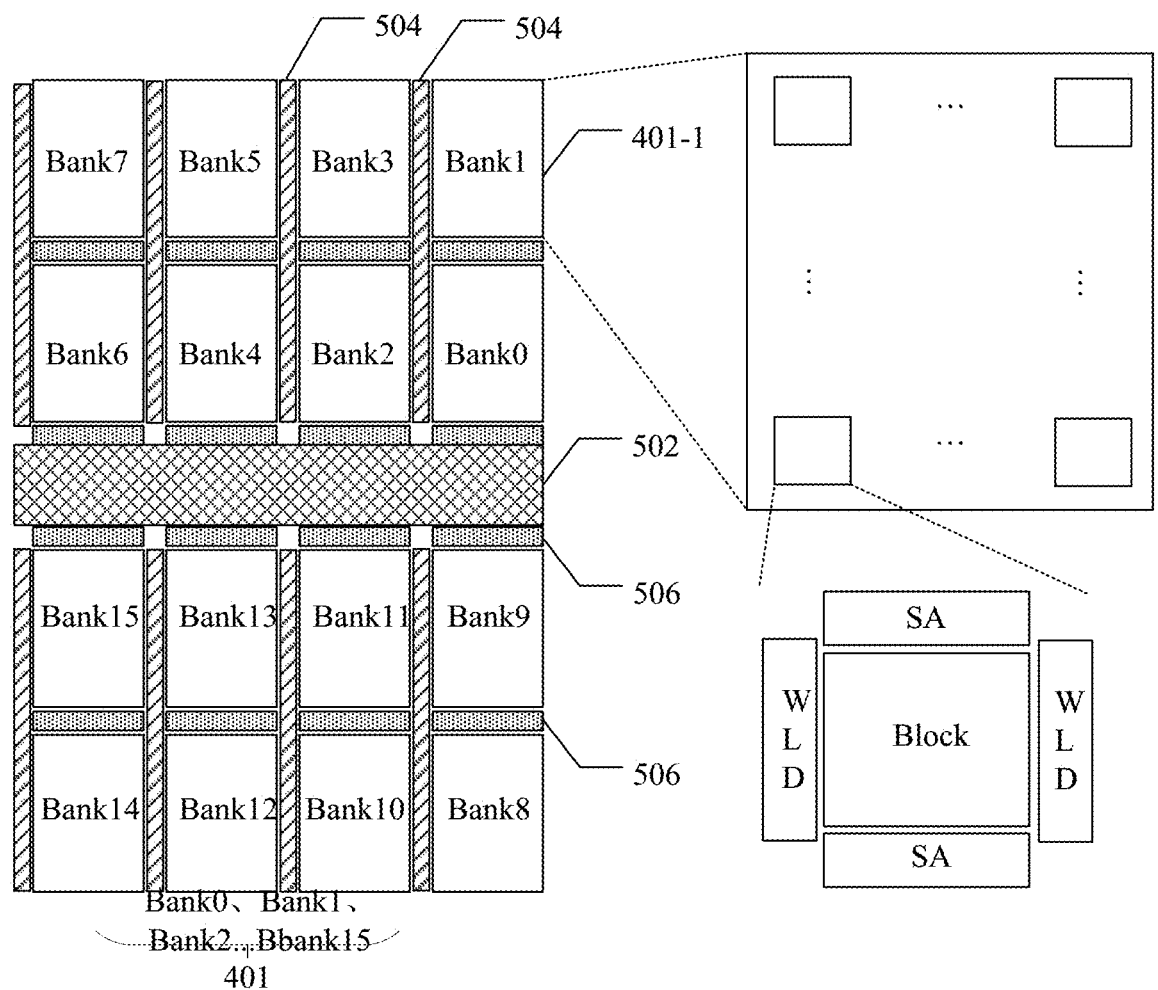
FIG. 5 is a first schematic top view of the distribution of a memory array and a peripheral circuit in an example memory according to some aspects of the present application.

In the actual application, for the layout between the memory array and the peripheral circuit, in some examples, the memory array and peripheral circuit are arranged side by side on the same substrate. An example schematic diagram of the distribution of the memory array and the peripheral circuit in an example memory is shown in FIG. 4, and a schematic top view of the distribution of the memory array and the peripheral circuit in an example memory is shown in FIG. 5. As shown in FIG. 4, the memory array 401 and the peripheral circuit 402 are arranged side by side. In some examples, the memory array includes M banks, each bank includes N blocks, a control circuit corresponding to the block is provided on at least one side of each block, and a control circuit corresponding to the bank is provided on at least one side of each bank. Every K banks among the M banks form a bank row, and the M banks form M/K bank rows. A peripheral circuit corresponding to all the banks are provided between the two bank rows in-between. It should be noted that, M, N, and K here are all positive integers, and M is an integer multiple of K.

As an example, as shown in FIG. 5, the memory array 401 includes 16 banks 401-1, and each bank includes a plurality of blocks. SAs and WLDs corresponding to each block are provided oppositely surrounding the block. Column decoders 504 and row decoders 506 corresponding to each bank are provided on both sides of the bank. Every 4 banks form a bank row, and 16 banks form 4 bank rows. A control circuit 502 is provided between the two bank rows in-between. It should be noted that the number of banks in FIG. 5 is only for illustration, and is not used to limit the number of banks in the memory in this application.

Figure 6:
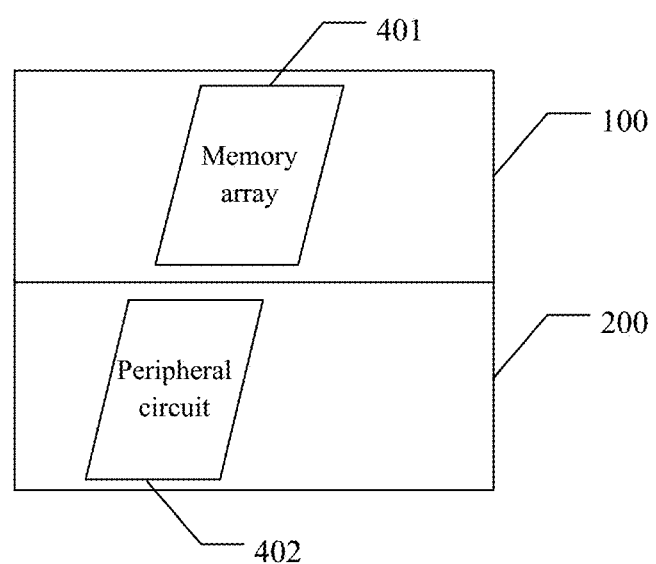
FIG. 6 is a second schematic diagram of the distribution of a memory array and a peripheral circuit in an example memory according to the examples of the present application.

In some examples, the memory array 401 and the peripheral circuit 402 may also be provided on two substrates. An example memory, as shown in FIG. 6, comprises: a first substrate 100, comprising at least a memory array 401;

a second substrate 200 comprising at least a peripheral circuit 402, wherein the first substrate 100 and the second substrate 200 are stacked and connected by bonding.

Here, the first substrate 100 may include, but not limited to, a silicon substrate. The first substrate 100 may include at least a memory array 401. Hereinafter, the first substrate 100 may also include a dummy memory array. The memory array 401 may include multiple banks, which are arranged in an array, and each bank includes multiple blocks or is referred as a storage bank. The multiple blocks are arranged in an array, each block includes a plurality of memory cell rows and a plurality of memory cell columns, and each memory cell row and each memory cell column includes a plurality of memory cells. The memory array 401 may also include a plurality of word lines and a plurality of bit lines, each memory cell row is coupled to a corresponding word line, and each memory cell column is coupled to a corresponding bit line.

Here, the second substrate 200 is different from the first substrate, and includes but not limited to a silicon substrate. In the following, the second substrate 200 includes a peripheral circuit 402. The peripheral circuit 402 may include a control circuit corresponding to a block and/or a control circuit corresponding to a bank. Here, the peripheral circuit 402 further includes a control circuit corresponding to all banks, such as a command buffer, a command decoder, an address buffer, a data buffer, a mode register, and the like.

In some examples, the memory as shown in FIG. 6 may further comprise: a bonding interface located between the first substrate and the second substrate;
  a first interconnection layer located between the first substrate and the bonding interface; and
  a second interconnection layer located between the second substrate and the bonding interface; and
  wherein the first substrate and the second substrate are connected through the first interconnection layer, the bonding interface and the second interconnection layer.

Here, the memory may further include the bonding interface, the first interconnection layer, and the second interconnection layer. Both the first interconnection layer and the second interconnection layer may include a plurality of bonding contacts and a dielectric for electrically isolating the bonding contacts. In some examples, the bonding contacts may include conductive materials including, but not limited to, tungsten (W), cobalt (Co), copper (Cu), aluminum (Al), silicide, or any combination thereof. Dielectric may include, but not limited to, silicon oxide, silicon nitride, silicon oxynitride, low-k (dielectric constant less than 3.9) dielectrics, or any combination thereof. In some examples, the first interconnection layer is formed on the first substrate, and the second interconnection layer is formed on the second substrate. Then, the memory array contained in the first substrate and the peripheral circuit contained in the second substrate are is bonded at the bonding interface, and the bonding contact and the surrounding dielectric can be connected by hybrid bonding. That is, in some examples, the bonding interface is vertically formed between the first interconnection layer and the second interconnection layer. In some examples, the memory array in the first substrate and the peripheral circuit in the second substrate are bonded through bonding contacts included in the first interconnect layer and bonding contacts included in the second interconnect layer at the bonding interface to enable the connection between the memory array and the peripheral circuit.

Figure 7:
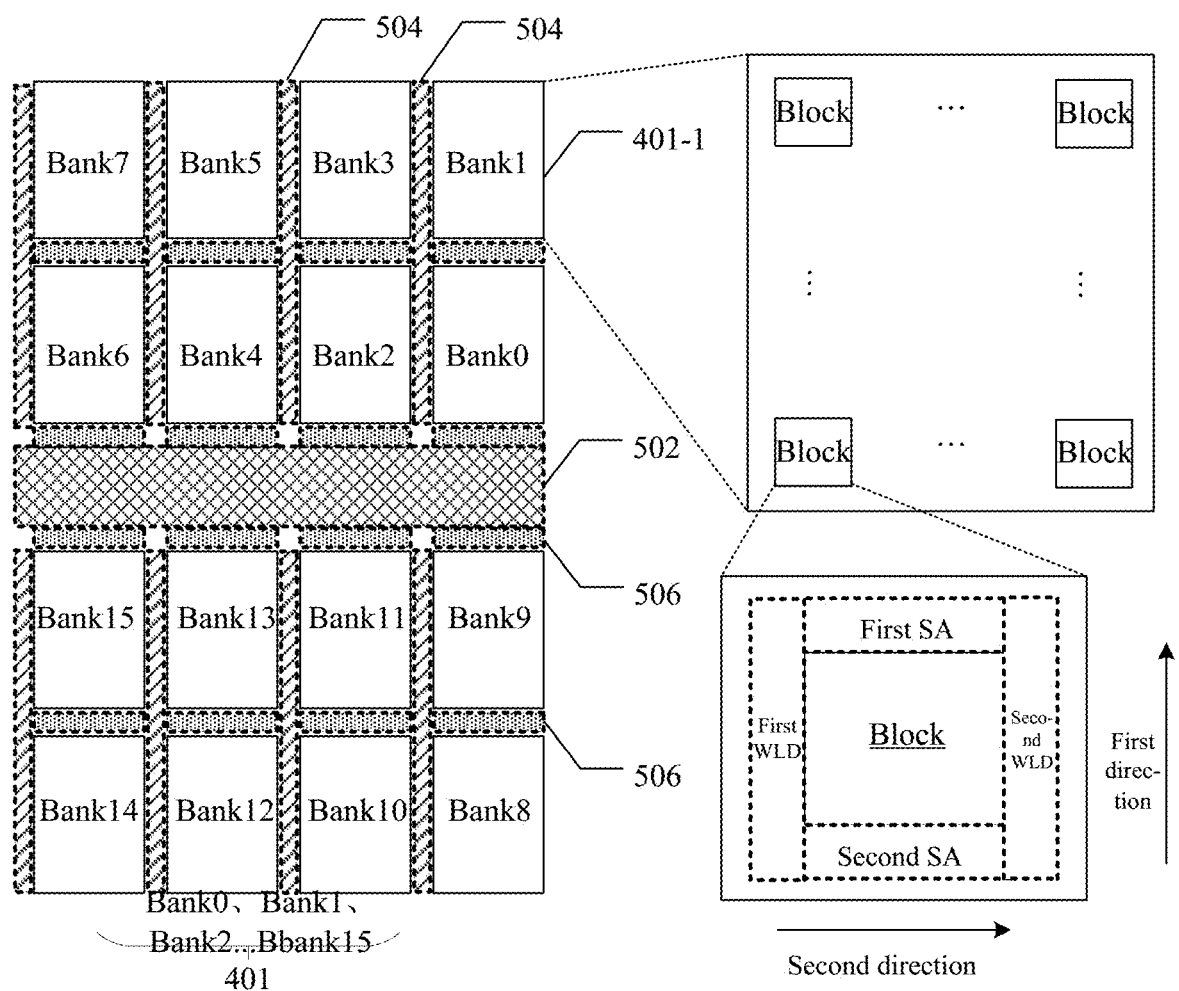
FIG. 7 is a second schematic top view of the distribution of a memory array and a peripheral circuit in an example memory according to the examples of the present application.

As an example, as shown in FIG. 7, a schematic top view of the distribution of a memory array and a peripheral circuit in the memory is shown. It should be noted that in FIG. 7, the first substrate 100 is located above the second substrate 200, the structure corresponding to the solid line in FIG. 7 is one located in the first substrate 100, and the structure corresponding to the dashed line in FIG. 7 is one located in the second substrate 200. The structures in the second substrate 200 are shown in perspective view for case of understanding.

In some examples, as shown in FIG. 7, the memory array 401 includes 16 banks 401-1, and each bank includes a plurality of blocks. A first SA and a second SA, which are provided opposite to each other in a first direction and correspond to each block, and a first WLD and a second WLD, which are provided opposite to each other in a second direction and correspond to each block, are provided directly below the block. Column decoder 504 and row decoder 506 corresponding to each bank is provided below two sides of the bank. Every 4 banks form a bank row, thus 16 banks form 4 bank rows, and a control circuit 502 is provided below between the two bank rows in-between.

It should be noted that the number of banks in FIG. 7 is only for illustration, and is not used to limit the number of banks in the memory in this application. The space in the first substrate which would otherwise accommodate the control circuit corresponding to each block and the control circuit corresponding to each bank can be freed, thereby offering a larger layout space for memory cells, word lines and bit lines.

It should be noted that the size relationship between the size of one block and the size of the surrounding SA and the word line driver as shown in FIG. 7 is provided only for illustration, but not for limiting the size relationship between the size of one block and size of one programming logic sub-unit and surrounding SA and word line driver in the memory of the present application.

It should be noted that the above are only two example layouts of the memory array and peripheral circuit, and in fact other layouts are possible. This application does not focus on the layout of the memory array and peripheral circuit, which will not repeat herein. The operation method provided by the example of the present application is applicable to various layouts of the memory array and peripheral circuit.

Figure 8:
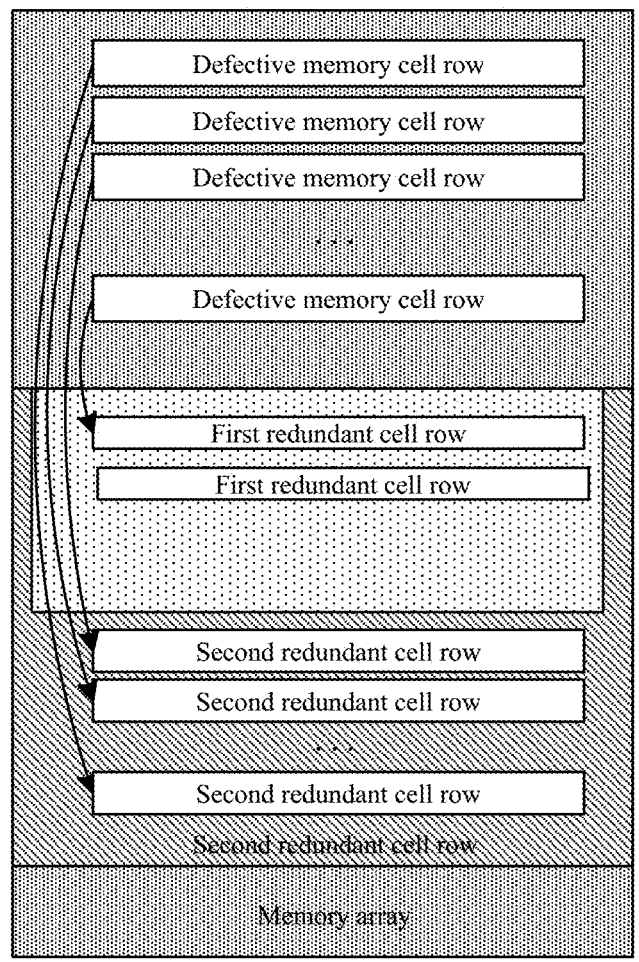
FIG. 8 and FIG. 9 are schematic diagrams for illustrating the conflict described in the present application according to an example of the present application.
Figure 9:
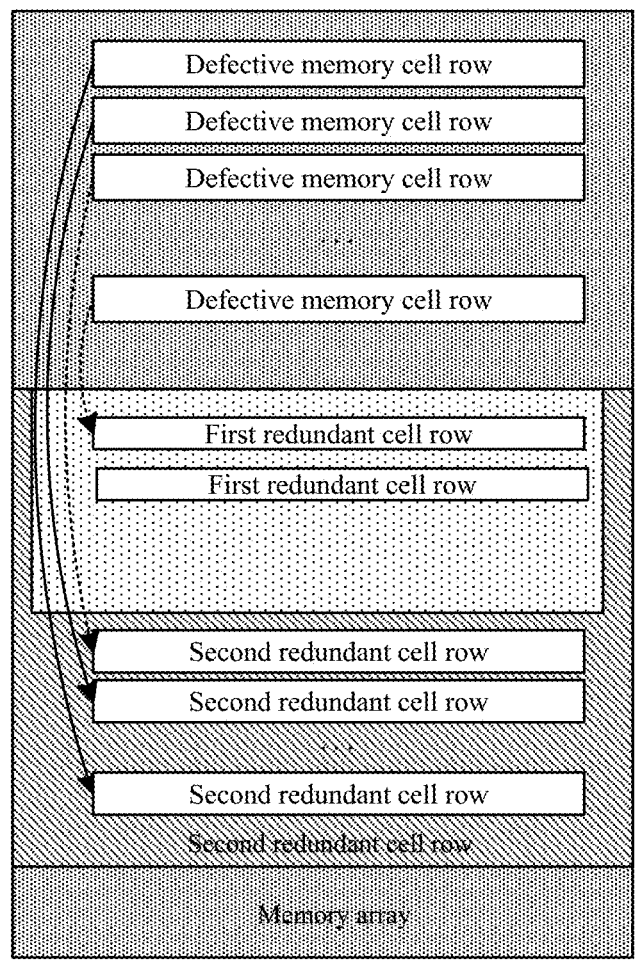

In some examples, such as in the aforementioned memory array 401, certain memory cells are defective due to manufacturing errors and/or malfunctions. For reasons like this, the memory array 401 includes some redundant memory cell rows (coupled to redundant word lines WL) to repair the defective memory cell rows. In some examples, some defective memory cell rows in the memory array can be repaired using redundant memory cell rows during a wafer sort process. In another example, defective memory cell rows in the memory array may be repaired by users using redundant storage cell rows after packaging, which is also referred to as a PPR after packaging. In practical applications, when the memory is being used by the user, the memory controller coupled to the memory is not aware of whether the defective memory cell rows are repaired during the wafer sort process. Therefore, for a defective memory cell row, if the defective memory cell row has been repaired in the wafer sort process after using PPR, then the defective memory cell row corresponds to two redundant memory cell rows, thus conflicts may occur in the subsequent use (for example, during use, it is not able to determine which redundant memory cell row is remapped to the defective memory cell row, resulting in errors in stored data, etc.). The understanding of the above conflicts is shown in FIG. 8 and FIG. 9. In FIG. 8, in the normal case, when the user uses PPR to repair defective memory cell rows, one defective memory cell row corresponds to one redundant memory cell row. Regarding the repair for the defective memory cell row, a defective memory cell row also corresponds to a redundant memory cell row, the same defective memory cell row is repaired by a PPR operation or repaired in the wafer sort process, and there is no conflict between the two. In actual situations, as shown in FIG. 9, when the user uses PPR to repair a defective memory cell row, it is not clear whether the defective memory cell row has been repaired during the wafer sort process. As such, conflict such as a defective memory cell row corresponds to two redundant memory cell rows, can occur, as shown in FIG. 9.

To solve the above-mentioned conflicts, a feasible way is as follows: for the defective memory cell row, the priority of the strategy for repairing after PPR is higher than that of the strategy for repairing during the wafer sort process. Thus, during subsequent use, the defective memory cell row is remapped to a redundant memory cell row corresponding to the PPR.

For the conflict as described above, the example of the present application provides an operation method of a memory. A first repair strategy used for a first defective cell row that has been repaired is invalidated in the PPR mode. Then, a second repair strategy is reconfigured to avoid conflicts in subsequent use caused by repeated repairs of the same defective cell row.

Figure 10:
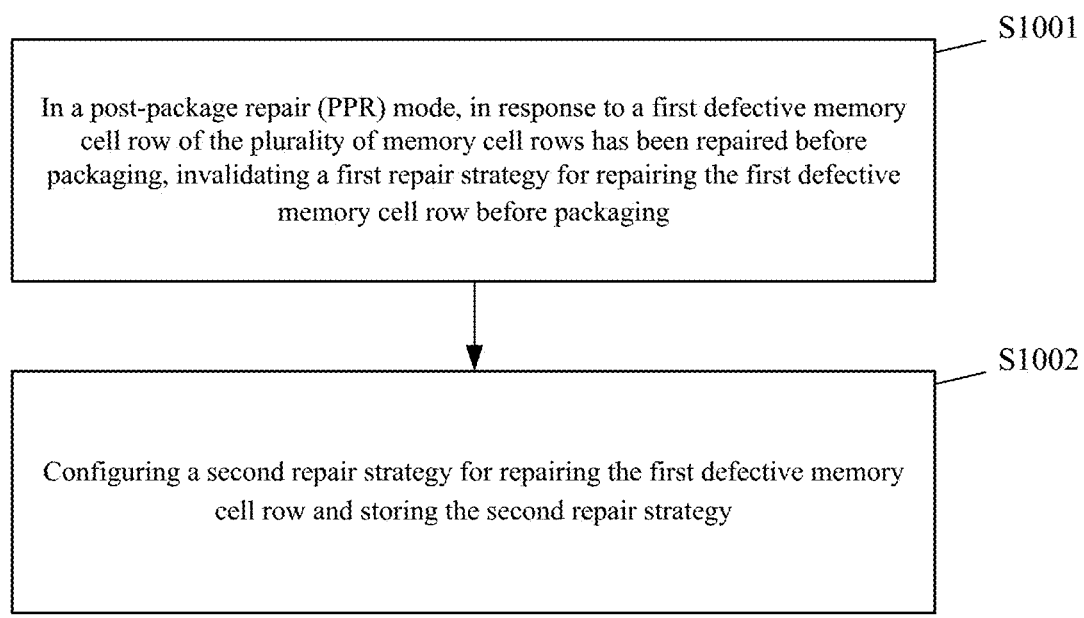
FIG. 10 is a first schematic flowchart of an operation method of a memory according to the examples of the present application.

As shown in FIG. 10, the specific operations of the operation method can be as follows.

S1001: in a post-package repair (PPR) mode, in response to a first defective memory cell row of the plurality of memory cell rows has been repaired before packaging, invalidating a first repair strategy for repairing the first defective memory cell row before packaging; and S1002: configuring a second repair strategy for repairing the first defective memory cell row and storing the second repair strategy.

It should be noted that the memory may include the aforementioned memory array, and the memory array includes a plurality of memory cell rows. Some memory cells of the plurality of memory cell rows may be defective, and a row containing a defective memory cell may be referred to as a defective row (or a bad row). As previously stated, in some cases, memory cell rows can become defective during use after the memory is packaged, such as encapsulated in a die package. The memory may perform one or more types of PPR operations to resolve defective row(s). As in the aforementioned conflict, when performing a PPR operation, if a defective memory cell row (such as a first defective memory cell) has been repaired before packaging (a first repair strategy already exists) and then the PPR operation is performed (a second repair strategy is formed), the two repair strategies correspond to one defective memory cell row (word line WL), thus a conflict occurs. Based on this, the operation method described with reference to FIG. 10 of the present application is to invalidate the first repair strategy for repairing the first defective memory cell before packaging (that is, disable the repair strategy) in a situation where the first defective memory cell has been repaired before packaging in the PPR mode. After that, configure the second repair strategy for repairing the first defective memory cell, and store the second repair strategy for future use. Here, the first defective memory cell is any one of a plurality of memory cell rows. In this example of the present application, the first defective memory cell row is taken as an example to illustrate the novel concept, and the number is not limited thereto.

Figure 11:
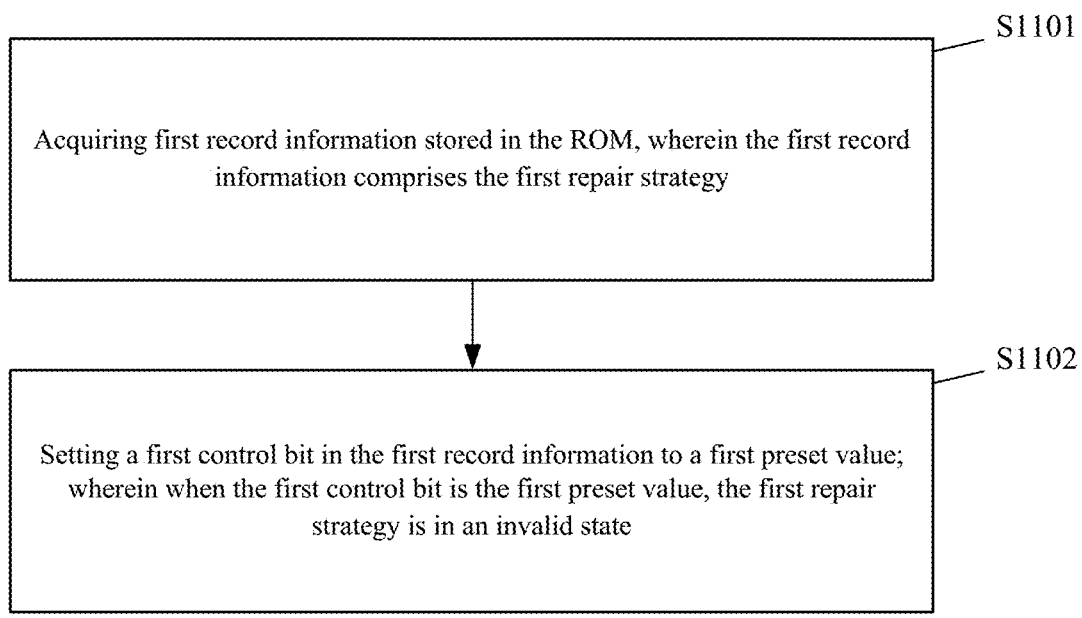
FIG. 11 is a second schematic flowchart of an operation method of a memory according to the examples of the present application.

In some examples, as shown in FIG. 11, the memory further comprises a read-only memory (ROM), and the invalidating a first repair strategy for repairing the first defective memory cell row before packaging may comprise:

S1101: acquiring first record information stored in the ROM, wherein the first record information comprises the first repair strategy; and S1102: setting a first control bit in the first record information to a first preset value;

wherein when the first control bit is the first preset value, the first repair strategy is in an invalid state.

It should be noted the process described herein is how to invalidate the first repair strategy. The ROM mentioned herein may be included in the aforementioned peripheral circuit, or may not be included in the peripheral circuit, but be coupled to the peripheral circuit, which is determined only depending on the differences in the way circuits or devices other than the memory array in the memory are divided. In some ways of division, the ROM is included in the peripheral circuit, and in some examples, the ROM may be included in the aforementioned control circuit. The method of invalidating the first repair strategy may include: first acquiring the stored first record information containing the first repair strategy from the ROM; after that, setting the first control bit in the first record information to the first preset value. When the first control bit is the first preset value, the first repair strategy is in an invalidated state, that is, it will not work in the future. In other words, the first defective memory cell will not be remapped to a corresponding redundant memory cell row according to the first repair strategy in subsequent use. In some examples, the first preset value may be "1".

In some examples, S1101 may comprise:

in response to indication information, obtaining second address information stored in the first record information according to first address information of the first defective memory cell row and a first mapping relationship, wherein the first mapping relationship comprises a correspondence between address information of a defective memory cell row and address information stored in corresponding record information; and acquiring the first record information from the ROM according to the second address information;

wherein the indication information is to indicate that the first defective memory cell row has been repaired.

It should be noted that the first address information may refer to the address information of the first defective memory cell row in memory array such as those described above. The second address information may refer to the address information stored in the first repair strategy corresponding to the first defective memory cell row. The above process includes: finding the second address information stored in the first repair strategy corresponding to the first address information from a pre-stored first mapping relationship according to the first address information; then, addressing the ROM according to the second address information, to obtain the first record information from the ROM. It should be understood that the first address information and the second address information are only two different addresses described, and are not limited in number.

In some examples, the memory further comprises a content addressable memory (CAM) coupled to the plurality of memory cell rows; and the method may further comprises:

acquiring first address information of the first defective memory cell row;

comparing the first address information with address information stored in the CAM; and in response to a comparison result indicates that a same address information as the first address information is stored in the CAM, generating indication information, wherein the indication information is to indicate that the first defective memory cell row has been repaired.

It should be noted that, as explained above, as for repairing defective rows before packaging, that is, repairing defective rows during the wafer sort process, the user cannot know whether the first defective memory cell row is repaired in the wafer sort process. Then, in the PPR mode, first determine whether the first defective memory cell row is repaired before packaging, so as to invalidate the first repair strategy on the premise that the first defective memory cell row is repaired before packaging. The process described here is an implementation of determining that the first defective memory cell has been repaired before packaging. Before explaining this implementation in detail, the meaning and function of CAM are firstly explained. CAM means a content-addressable memory. The CAM may or may not be included in the peripheral circuit, as mentioned above, only the ways of division are different, and its actual location is not affected. In some examples, the CAM can be provided around the storage banks of the memory array as shown in FIG. 5 and FIG. 7, such as being included in the control circuit 502. The operation principle of CAM is to compare the input data with the data already stored inside the CAM. If there is the same content, the address data for the stored same data and a search success signal are output. Otherwise, the search success signal is not output. In the example of the present application, the function of the CAM is to store a repair strategy corresponding to a certain defective memory cell row, so as to actually repair the defective memory cell row. For example, it is assumed that the first repair strategy is stored in the ROM (non-volatile after power failure). During the use of the memory, when performing an operation on the first defective memory cell row, the first repair strategy in the ROM should be loaded into the CAM (volatile after power failure), and then the CAM will actually repair the first defective memory cell according to the first repair strategy.

In fact, the understanding of the operations of the above-mentioned implementation of determining whether the first defective memory cell row is repaired before packaging can be as follows: first obtaining the first address information of the first defective memory cell row; then comparing the first address information with the address information stored in the CAM; if the comparison result indicates that a same address information as the first address information is stored in the CAM, generating the indication information (that is, the aforementioned search successful signal). That is, the address information of the first defective memory cell row is stored in the CAM. In other words, when the indication information is generated, it indicates that the first defective memory cell row has been repaired before packaging. Conversely, when no indication information is generated, it indicates that the first defective memory cell row has not been repaired before packaging. At this time, the first repair strategy does not exist, and the PPR operation can be directly performed to generate the second repair strategy (that is, a repair strategy under the PPR operation).

In some examples, the memory further comprises a plurality of first redundant cell rows, and the configuring a second repair strategy for repairing the first defective memory cell row and storing the second repair strategy comprise:

selecting a first redundant cell row from the plurality of first redundant cell rows to establish a second mapping relationship with the first defective memory cell row, wherein the second mapping relationship is the second repair strategy;

generating second record information according to the second repair strategy; and storing the second recording information into the ROM;

wherein the first control bit in the second record information is a second preset value, and when the first control bit is the second preset value, the second repair strategy is in a valid state.

It should be noted that the first redundant cell row mentioned here is the redundant memory cell row described above. The configuring the second repair strategy comprises selecting the first redundant cell row from the plurality of first redundant cell rows to establish the second mapping relationship with the first defective memory cell row. The storing the second repair strategy comprises storing the established second mapping relationship in the aforementioned ROM. At this time, the first control bit in the second record information stored in the ROM is set to the second preset value. When the first control bit in the second record information is the second preset value, the second repair strategy is in a valid state. That is, the second repair strategy will be used to repair the first defective memory cell row during subsequent use. In some examples, the second preset value may be "0".

In some examples, the memory further comprises a plurality of second redundant cell rows different from the plurality of first redundant cell rows, and the first repair strategy comprises a mapping relationship between the first defective memory cell row and a second redundant cell row of the plurality of second redundant cell rows.

That is, the redundant cell rows used for the first repair strategy and the second repair strategy are different. In some examples, as shown in FIGS. 8 and 9, the plurality of first redundant cell rows may refer to redundant memory cell rows assigned to be used in the PPR operation, and the plurality of second redundant cell rows may refer to redundant memory cell rows assigned to be used in repairing defective memory cell rows during wafer sort process.

In some examples, the method may further include:

when performing an operation on the memory, determining whether the first repair strategy is valid or the second repair strategy is valid;

in response to the first repair strategy being valid: loading the first repair strategy; and repairing the first defective memory cell row using the first repair strategy; and in response to the second repair strategy being valid: loading the second repair strategy; and repairing the first defective memory cell row using the second repair strategy.

Here, the operation may comprise performing a power-on-reset operation on the memory.

That is to say, after the memory is powered on, it is determined whether the first repair strategy is valid or the second repair strategy is valid. If the first repair strategy is valid, loading the first repair strategy, and repairing the first defective memory cell row using the first repair strategy. If the second repair strategy is valid, loading the second repair strategy, and repairing the first defective memory cell row using the second repair strategy.

In some examples, the determining whether the first repair strategy is valid or the second repair strategy is valid may comprise:

acquiring the first record information and the second record information; and determining whether the first repair strategy is valid or the second repair strategy is valid according to the first control bit in the first record information and the first control bit in the second record information;

wherein a value to which the first control bit corresponding to the first repair strategy is set is always different from a value to which the first control bit corresponding to the second repair strategy is set.

It should be noted that when determining whether to use the first repair strategy or the second repair strategy, it is determined whether the first repair strategy or the second repair strategy is valid according to the first control bit in the first record information including the first repair strategy and the first control bit in the second record information including the second repair strategy obtained from the ROM. In practice, only one of the first repair strategy and the second repair strategy is used to repair the first defective memory cell. Therefore, a value to which the first control bit in the first record information is set is always different from a value to which the first control bit in the second record information is set.

In some examples, the first record information further comprises a second control bit, wherein the second control bit is to indicate whether the first repair strategy is to be enabled.

In an actual application, the first record information further includes the second control bit, and the second control bit is to indicate whether the first repair strategy is to be enabled. The function of the second control bit is different from that of the aforementioned first control bit. The first control bit is a control bit indicating whether the first repair strategy is valid when determining that the first defective memory cell row is to be repaired, and the second control bit is a control bit indicating whether the first defective memory cell is to be repaired. Only when the second control bit is set to a third preset value (such as 1), it indicates that the first repair strategy will be enabled.

In summary, the operation method provided by the example of the present application includes two operations: the first operation is to obtain the defective memory cell row that has been repaired (such as the first defective memory cell row mentioned above), invalidate the repair strategy (such as the first repair strategy) for repairing the defective memory cell row stored in the ROM, configure the repair strategy (such as the second repair strategy) for repairing the defective memory cell row in the PPR mode, and store the reconfigured repair strategy; and the second operation is to load, after the memory is powered on next time, the reconfigured repair strategy from the ROM to the CAM for use.

Figure 13:
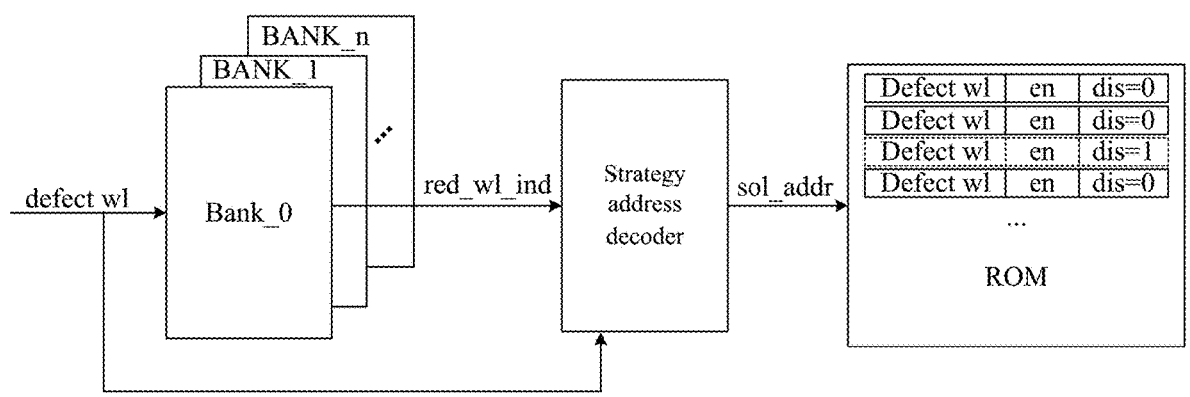
Figure 14:
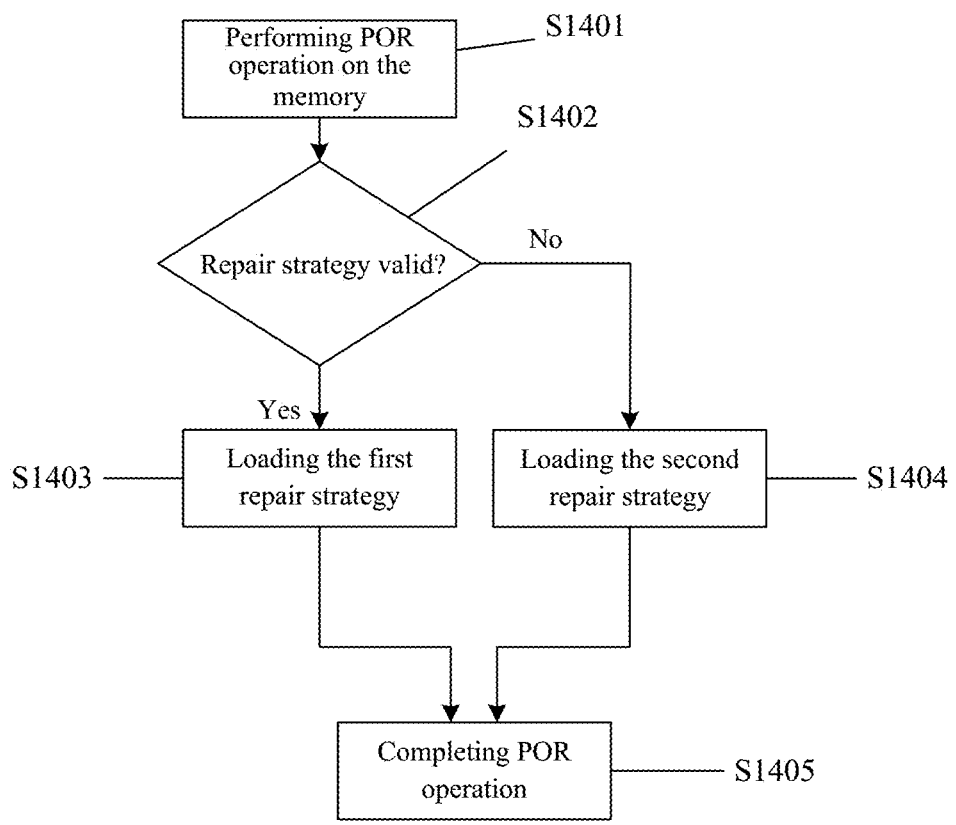
Figure 15:
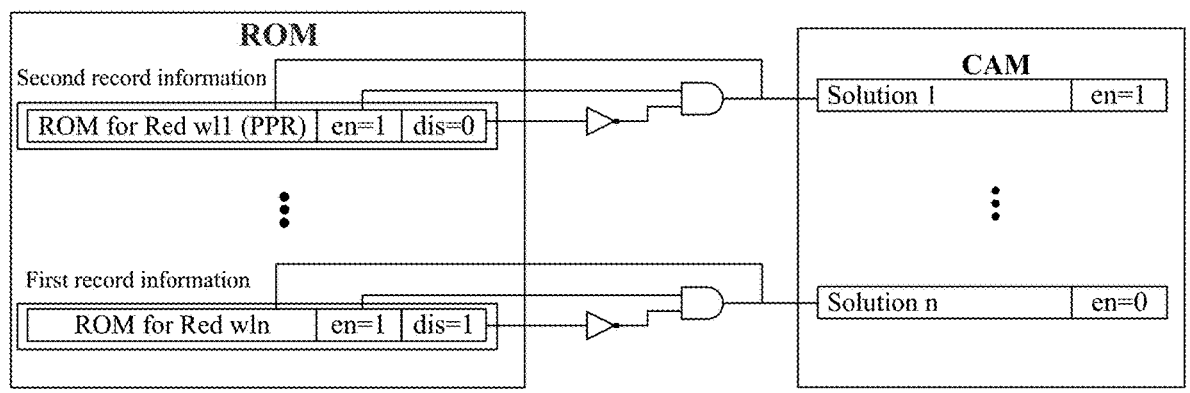

In order to understand the present application, the present application will be described by taking the aforementioned first defective memory cell row as an example. In some examples, as shown in FIGS. 12-15, wherein FIG. 12 is a schematic flowchart for implementating the first operation of the operation method according to the examples of the present application, FIG. 13 is a schematic flowchart illustrating the implementation for invalidating the first repair strategy for the first defective memory cell row according to an example of the present application, FIG. 14 is a schematic flowchart for implementating the the second operation of the operation method according to the example of the present application, and FIG. 15 is a schematic flowchart of an implementation of the flowchart in FIG. 14 according to an example of the present application.

Figure 12:
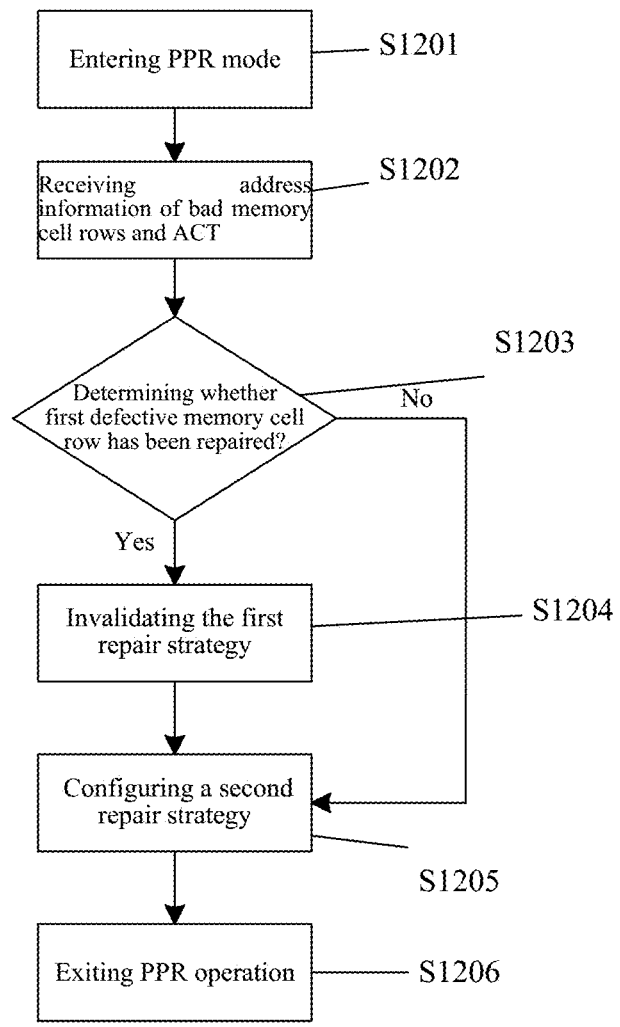
FIG. 12-15 are schematic flowcharts for implementing the operation method provided in the present application according to the examples of the present application.

In FIG. 12, the process implemented in the first operation can be as follows.

S1201: The memory enters a PPR mode in response to a received PPR command, wherein the PPR command may refer to a combination of a mode register command MRS4 and address information (such as A13). In the actual application, the memory enters the PPR mode based on the combination of the mode register command MRS4 and the address information (such as A13).

S1202: The memory receives a bank group address BG_f, a bank address BA_f, a row address RA_f and an activation command ACT which jointly indicate the location of the bad memory cell row.

S1203: Determined whether the defective memory cell row to be repaired (such as the first defective memory cell row) has been repaired; if yes, executing operation S1204; if not, executing operation S1205.

S1204: Invalidating a repair strategy (such as the first repair strategy) corresponding to the defective memory cell row stored in the ROM.

S1205: Configuring a repair strategy (such as the second repair strategy) corresponding to the defective memory cell row in the PPR mode, and storing the repair strategy corresponding to the defective memory cell row in the PPR mode in the ROM; for example, storing the second repair strategy in the ROM.

S1206: Exiting the PPR mode.

In FIG. 13, the process of invalidating the first repair strategy for the first defective memory cell row may be as follows. The control circuit of the memory obtains the first address information of the first defective memory cell row defect wl, compares the first address information with the address information stored in the CAM (provided near the bank), and when the first address information is the same as the address information stored in the CAM, generates the indication information red_wl_ind. Then, a strategy address decoder analyzes the first address information in response to the indication information to obtain the second address information sol_addr of the first repair strategy stored in the ROM, obtains the first record information from the ROM according to the sol_addr, and sets the first control bit in the first record information to the first preset value, thereby invalidating the first repair strategy.

In FIG. 14, the process implemented in the second operation can be as follows:

S1401: Performing a Power-On-Reset (POR) operation on the memory;

S1402: Determining whether the first repair strategy is valid or the second repair strategy is valid according to the first control bit dis in the first record information and the first control bit dis in the second record information;

S1403: When the first control bit dis in the first record information is a second preset value, indicating that the first repair strategy is valid, loading the first repair strategy, and repairing the first defective memory cell row using the first repair strategy;

S1404: When the first control bit dis in the second record information is a second preset value, indicating that the second repair strategy is valid, loading the second repair strategy, and repairing the first defective memory cell row using the second repair strategy; and S1405: Completing the power-on-reset operation.

In FIG. 15, the first preset value is 1, and the second preset value is 0. When the first control bit dis in the first record information is 1, the first repair strategy is invalid. At this time, the first control bit dis in the second record information is 0, and the second repair strategy is valid. It should be noted that, at this time, the second control bits en in both the first record information and in the second record information are 1, indicating that the repair is to be enabled.

Figure 16:
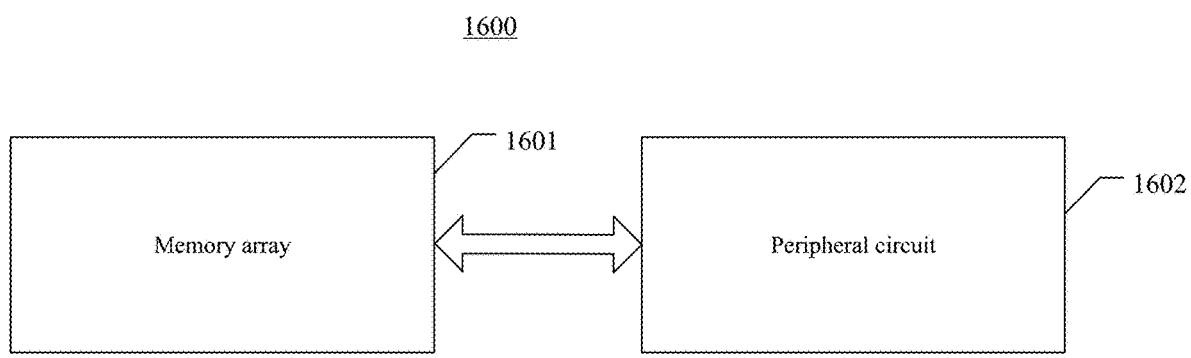
FIG. 16 is a schematic structural diagram of a memory according to the examples of the present application.

As shown in FIG. 16, examples of the present application further provide a memory 1600, comprising:

a memory array 1601 comprising a plurality of memory cell rows;

a peripheral circuit 1602 coupled to the memory array and configured to:

in a post-package repair (PPR) mode, in response to a first defective memory cell row of the plurality of memory cell rows has been repaired before packaging, invalidate a first repair strategy for repairing the first defective memory cell row before packaging; and configure a second repair strategy for repairing the first defective memory cell row and store the second repair strategy.

In some examples, the memory further comprises a read-only memory (ROM), and the peripheral circuit is further configured to:

acquire first record information stored in the ROM, wherein the first record information comprises the first repair strategy; and set a first control bit in the first record information to a first preset value;

wherein when the first control bit is the first preset value, the first repair strategy is in an invalid state.

In some examples, the memory further comprises a content-addressable memory (CAM) coupled to the plurality of memory cell rows, and the peripheral circuit is further configured to:

acquire first address information of the first defective memory cell row and transmit the first address information to the CAM; and wherein, the CAM is configured to: compare the first address information with address information stored in the CAM; and in response to a comparison result indicates that a same address information as the first address information is stored in the CAM, generate indication information, wherein the indication information is to indicate that the first defective memory cell row has been repaired.

In some examples, the peripheral circuit is further configured to:

in response to indication information, obtain second address information stored in the first record information according to first address information of the first defective memory cell row and a first mapping relationship, wherein the first mapping relationship comprises a correspondence between address information of a defective memory cell row and address information stored in corresponding record information; and acquire the first record information from the ROM according to the second address information;

wherein the indication information is to indicate that the first defective memory cell row has been repaired.

In some examples, the memory array further comprises a plurality of first redundant cell rows, and the peripheral circuit is further configured to:

select a first redundant cell row from the plurality of first redundant cell rows to establish a second mapping relationship with the first defective memory cell row, wherein the second mapping relationship is the second repair strategy;

generate second record information according to the second repair strategy; and store the second recording information into the ROM;

wherein the first control bit in the second record information is a second preset value, and when the first control bit is the second preset value, the second repair strategy is in a valid state.

In some examples, the peripheral circuit is further configured to: when performing an operation on the memory, determining whether the first repair strategy is valid or the second repair strategy is valid;

in response to the first repair strategy being valid: loading the first repair strategy; and repairing the first defective memory cell row using the first repair strategy; and in response to the second repair strategy being valid: loading the second repair strategy; and repairing the first defective memory cell row using the second repair strategy.

In some examples, the peripheral circuit is further configured to: acquire the first record information and the second record information; and determine whether the first repair strategy is valid or the second repair strategy is valid according to the first control bit in the first record information and the first control bit in the second record information;

wherein a value to which the first control bit corresponding to the first repair strategy is set is always different from a value to which the first control bit corresponding to the second repair strategy is set.

In some examples, the memory array further comprises a plurality of second redundant cell rows different from the plurality of first redundant cell rows, and the first repair strategy comprises a mapping relationship between the first defective memory cell row and a second redundant cell row of the plurality of second redundant cell rows.

It should be noted that the memory provided by the example of the present application is the subject of executing the operation method provided above. Therefore, the operations to be performed by each device described herein have been described in detail in the operation method above, and will not be repeated here.

Figure 17:
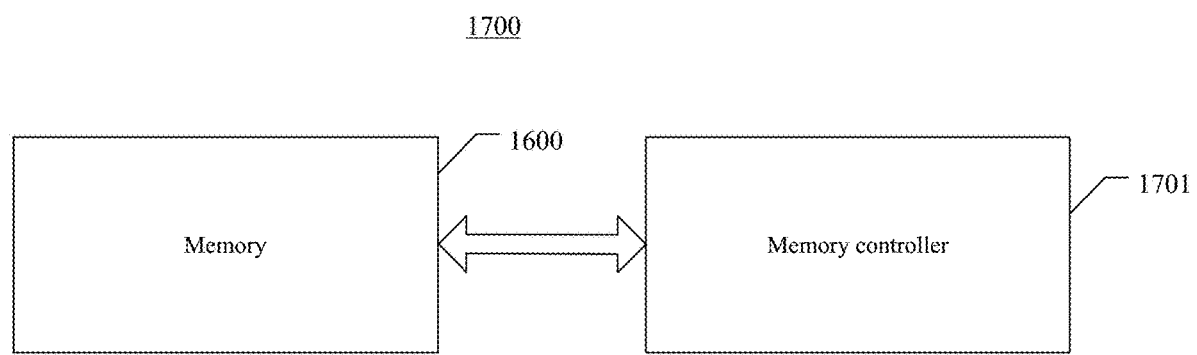
FIG. 17 is a schematic structural diagram of a memory system according to the examples of the present application.

As shown in FIG. 17, an example of the present application further provides a memory system 1700, comprising: one or more memories 1600 described in any one of the aspects; and a memory controller 1701 coupled to the memories and configured to control the memories.

It should be noted that the memory system includes the memory described above. Therefore, for the description of the memory, reference may be made to the foregoing description, and details are not repeated here.

An example of the present application further provides a computer system, comprising: the aforementioned memory system; and an image processor coupled to the memory system and configured to control the memory system.

In some examples, the image processor and the memory controller are integrated on the same die, and the die and the memory are integrated on the same printed circuit board. For an understanding of the structure, reference may be made to the description in conjunction with FIG. 2.

The above description is intended to be illustrative, not restrictive. For example, the above instances (or one or more aspects thereof) may be used in combination with each other. Other examples may be used, such as would be available to one of ordinary skill in the art upon reading the above description. It should be understood that the examples will not be used to interpret or limit the scope or meaning of the claims. Furthermore, in the foregoing Detailed Description, various features may be grouped together to simplify the application. This should not be interpreted as implying that an unclaimed disclosed feature is essential to any claim. Rather, disclosed subject matter may lie in less than all features of a particular disclosed example. Thus the following claims are hereby incorporated into the Detailed Description, with each claim standing on its own as a separate example, and it is contemplated that these examples may be combined with each other in various combinations or permutations. The scope of the application should be determined with reference to the appended claims together with the full scope of equivalents to which such claims are entitled.

What is claimed is:

1. An operation method of a memory performed in a post-package repair (PPR) mode, wherein the method comprises:

determining that a first defective memory cell row of a plurality of memory cell rows in the memory was repaired pre-packaging before based on a first repair strategy for repairing the first defective memory cell row before packaging the memory to an electronic device;

in response to the determination that the first defective memory cell row was repaired pre-packaging, setting a first control bit to a first preset value indicating that the first repair strategy is invalid;

configuring a second repair strategy for repairing the first defective memory cell row by setting a second control bit to a second preset value indicating that the second repair strategy is valid; and storing the second repair strategy to the memory.

2. The operation method of claim 1, wherein the memory further comprises a read-only memory (ROM), and the method further comprises:

before setting the first control bit to the first preset value, acquiring first record information stored in the ROM, wherein the first record information comprises the first repair strategy.

3. The operation method of claim 2, wherein the acquiring first record information stored in the ROM comprises:

in response to indication information, obtaining second address information stored in the first record information according to first address information of the first defective memory cell row and a first mapping relationship, wherein the first mapping relationship comprises a correspondence between address information of a defective memory cell row and address information stored in corresponding record information; and acquiring the first record information from the ROM according to the second address information, wherein the indication information indicates that the first defective memory cell row has been repaired.

4. The operation method of claim 2, wherein the memory further comprises a plurality of first redundant cell rows, and the configuring a second repair strategy for repairing the first defective memory cell row and storing the second repair strategy comprises:

selecting a first redundant cell row from the plurality of first redundant cell rows to establish a second mapping relationship with the first defective memory cell row, wherein the second mapping relationship is the second repair strategy;

generating second record information according to the second repair strategy; and storing the second record information into the ROM, wherein the first control bit in the second record information is a second preset value, and when the first control bit is the second preset value, the second repair strategy is in a valid state.

5. The operation method of claim 4, further comprising:

when performing an operation on the memory, determining whether the first repair strategy is valid or the second repair strategy is valid;

in response to the first repair strategy being valid:
loading the first repair strategy; and
repairing the first defective memory cell row using the first repair strategy; and in response to the second repair strategy being valid:
loading the second repair strategy; and
repairing the first defective memory cell row using the second repair strategy.

6. The operation method of claim 5, wherein the determining whether the first repair strategy is valid or the second repair strategy is valid comprises:

acquiring the first record information and the second record information; and determining whether the first repair strategy is valid or the second repair strategy is valid according to the first control bit in the first record information and the first control bit in the second record information, wherein a value to which the first control bit corresponding to the first repair strategy is set is different from a value to which the first control bit corresponding to the second repair strategy is set.

7. The operation method of claim 5, wherein the operation comprises performing a power-on-reset operation on the memory.

8. The operation method of claim 4, wherein the memory further comprises a plurality of second redundant cell rows different from the plurality of first redundant cell rows, and the first repair strategy comprises a mapping relationship between the first defective memory cell row and a second redundant cell row of the plurality of second redundant cell rows.

9. The operation method of claim 2, wherein the first record information further comprises a second control bit that indicates whether the first repair strategy is to be enabled.

10. The operation method of claim 1, wherein the memory further comprises a content addressable memory (CAM) coupled to the plurality of memory cell rows, and the method further comprises:

acquiring first address information of the first defective memory cell row;

comparing the first address information with address information stored in the CAM; and in response to a comparison result indicating that a same address information as the first address information is stored in the CAM, generating indication information indicating that the first defective memory cell row has been repaired.

11. A memory, comprising:

a memory array comprising a plurality of memory cell rows;

a peripheral circuit coupled to the memory array and configured to:

determine that a first defective memory cell row of a plurality of memory cell rows in the memory was repaired pre-packaging based on a first repair strategy for repairing the first defective memory cell row before packaging the memory to an electronic device;

in response to determining that the first defective memory cell row was repaired pre-packaging, set, in a post-package repair (PPR) mode, a first control bit to a first preset value indicating that the first repair strategy is invalid; and configure a second repair strategy for repairing the first defective memory cell and store the second repair strategy by setting a second control bit to a second preset value indicating that the second repair strategy is valid.

12. The memory of claim 11, wherein the memory further comprises a read-only memory (ROM), and the peripheral circuit is further configured to:

acquire first record information stored in the ROM, wherein the first record information comprises the first repair strategy; and set a first control bit in the first record information to a first preset value, wherein when the first control bit is the first preset value, the first repair strategy is in an invalid state.

13. The memory of claim 12, wherein the peripheral circuit is further configured to:

in response to indication information, obtain second address information stored in the first record information according to first address information of the first defective memory cell row and a first mapping relationship, wherein the first mapping relationship comprises a correspondence between address information of a defective memory cell row and address information stored in corresponding record information; and acquire the first record information from the ROM according to the second address information, wherein the indication information indicates that the first defective memory cell row has been repaired.

14. The memory of claim 12, wherein the memory array further comprises a plurality of first redundant cell rows, and the peripheral circuit is further configured to:

select a first redundant cell row from the plurality of first redundant cell rows to establish a second mapping relationship with the first defective memory cell row, wherein the second mapping relationship is the second repair strategy;

generate second record information according to the second repair strategy; and store the second record information into the ROM, wherein the first control bit in the second record information is a second preset value, and when the first control bit is the second preset value, the second repair strategy is in a valid state.

15. The memory of claim 14, wherein the peripheral circuit is further configured to:

when performing an operation on the memory, determining whether the first repair strategy is valid or the second repair strategy is valid;

in response to the first repair strategy being valid:
loading the first repair strategy; and
repairing the first defective memory cell row using the first repair strategy; and in response to the second repair strategy being valid:
loading the second repair strategy; and
repairing the first defective memory cell row using the second repair strategy.

16. The memory of claim 15, wherein the peripheral circuit is further configured to:

acquire the first record information and the second record information; and determine whether the first repair strategy is valid or the second repair strategy is valid according to the first control bit in the first record information and the first control bit in the second record information, wherein a value to which the first control bit corresponding to the first repair strategy is set is different from a value to which the first control bit corresponding to the second repair strategy is set.

17. The memory of claim 14, wherein the memory array further comprises a plurality of second redundant cell rows different from the plurality of first redundant cell rows, and the first repair strategy comprises a mapping relationship between the first defective memory cell row and a second redundant cell row of the plurality of second redundant cell rows.

18. The memory of claim 11, further comprising a content-addressable memory (CAM) coupled to the plurality of memory cell rows, and the peripheral circuit is further configured to:

acquire first address information of the first defective memory cell row and transmit the first address information to the CAM; and wherein, the CAM is configured to:
compare the first address information with address information stored in the CAM; and
in response to a comparison result indicating that a same address information as the first address information is stored in the CAM, generate indication information indicating that the first defective memory cell row has been repaired.

19. A memory system, comprising:

one or more memories, each comprising:
a memory array comprising a plurality of memory cell rows;
a peripheral circuit coupled to the memory array and configured to:
determine that a first defective memory cell row of a plurality of memory cell rows in the memory was repaired pre-packaging based on a first repair strategy for repairing the first defective memory cell row before packaging the memory to an electronic device;
in response to determining that the first defective memory cell row was repaired pre-packaging, set, in a post-package repair (PPR) mode, a first control bit to a first preset value indicating that the first repair strategy is invalid; and
configure a second repair strategy for repairing the first defective memory cell and store the second repair strategy by setting a second control bit to a second preset value indicating that the second repair strategy is valid; and a memory controller coupled to the memories and configured to control the memories.

20. The memory system of claim 19, wherein the one or more memories, each further comprising a read-only memory (ROM), and the peripheral circuit is further configured to:

acquire first record information stored in the ROM, wherein the first record information comprises the first repair strategy; and set a first control bit in the first record information to a first preset value, wherein when the first control bit is the first preset value, the first repair strategy is in an invalid state.

* * * * *